US006261674B1

(12) United States Patent
Branham et al.

(10) Patent No.: US 6,261,674 B1
(45) Date of Patent: Jul. 17, 2001

(54) BREATHABLE MICROLAYER POLYMER FILM AND ARTICLES INCLUDING SAME

(75) Inventors: Kelly Dean Branham, Lawrenceville, GA (US); Vasily Topolkaraev, Appleton; Dave A. Soerens, Neenah, both of WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/221,100

(22) Filed: Dec. 28, 1998

(51) Int. Cl.⁷ .................................................... B32B 7/00

(52) U.S. Cl. .................. 428/218; 428/315.5; 428/316.6; 442/370; 442/372; 442/374; 442/375

(58) Field of Search .................. 442/370, 372, 442/374, 375; 428/315.5, 316.6, 218

(56) References Cited

U.S. PATENT DOCUMENTS

| | | | |
|---|---|---|---|
| T901,007 | 8/1972 | Govindan et al. | 117/63 |
| 2,185,789 | 1/1940 | Jacque et al. | 18/54 |
| 3,051,453 | 8/1962 | Sluijters | 259/4 |
| 3,097,991 | 7/1963 | Miller et al. | 162/157 |
| 3,323,978 | 6/1967 | Rasmussen | 161/169 |
| 3,435,705 | 12/1969 | Harmon | 161/59 |
| 3,461,193 | 8/1969 | Gilardi | 264/53 |
| 3,515,325 | 6/1970 | Kalwaites | 225/93 |
| 3,539,666 | 11/1970 | Schirmer | 266/51 |
| 3,564,677 | 2/1971 | Kalwaites | 28/1 |
| 3,576,707 | 4/1971 | Schrenk et al. | 161/164 |
| 3,577,586 | 5/1971 | Kalwaites | 18/1 |
| 3,595,454 | 7/1971 | Kalwaites | 225/3 |
| 3,639,199 | 2/1972 | Brandts et al. | 161/57 |
| 3,654,928 | 4/1972 | Duchane | 128/290 |
| 3,656,672 | 4/1972 | Kalwaites | 225/3 |
| 3,683,917 | 8/1972 | Comerford | 128/287 |
| 3,712,847 | 1/1973 | Rasmussen | 161/15 |
| 3,717,541 | 2/1973 | Schirmer | 161/169 |
| 3,719,540 | 3/1973 | Hall | 156/267 |
| 3,954,928 | 5/1976 | Omori et al. | 264/51 |
| 3,991,754 | 11/1976 | Gertzman | 128/156 |
| 4,141,713 | 2/1979 | Ammannati et al. | 65/182 |
| 4,229,239 | 10/1980 | Arai et al. | 156/155 |
| 4,269,650 | 5/1981 | Arai et al. | 156/540 |
| 4,301,203 | 11/1981 | Keuchel | 428/203 |
| 4,344,804 | 8/1982 | Bijen et al. | 156/42 |
| 4,377,544 | 3/1983 | Rasmussen | 264/139 |
| 4,416,791 | 11/1983 | Haq | 252/90 |
| 4,654,395 | 3/1987 | Schulz et al. | 526/318 |
| 4,655,868 | 4/1987 | Hefele | 156/238 |
| 4,705,584 | 11/1987 | Lauchenauer | 156/79 |
| 4,731,143 | 3/1988 | Cross | 156/231 |
| 4,837,078 | 6/1989 | Harrington | 428/284 |
| 4,874,568 | 10/1989 | Chau et al. | 264/41 |
| 5,033,172 | 7/1991 | Harrington | 28/107 |
| 5,045,387 | 9/1991 | Schmalz | 428/284 |
| 5,096,640 | 3/1992 | Brody et al. | 264/49 |
| 5,102,601 | 4/1992 | Farris et al. | 264/183 |
| 5,104,367 | 4/1992 | Hill | 493/42 |
| 5,120,598 | 6/1992 | Robeson et al. | 428/288 |
| 5,147,696 | 9/1992 | Lansbury et al. | 428/36.4 |
| 5,178,812 | 1/1993 | Sanford et al. | 264/171 |
| 5,182,162 | 1/1993 | Andrusko | 428/219 |
| 5,205,968 | 4/1993 | Damrow et al. | 264/28 |
| 5,208,098 | 5/1993 | Stover | 428/284 |
| 5,227,101 | 7/1993 | Mahoney et al. | 264/28 |
| 5,246,647 | 9/1993 | Beck et al. | 264/41 |
| 5,248,461 | 9/1993 | Pluyter et al. | 264/41 |
| 5,257,982 | 11/1993 | Cohen et al. | 604/378 |
| 5,300,358 | 4/1994 | Evers | 428/286 |
| 5,330,827 | 7/1994 | Hansen | 428/283 |
| 5,470,640 | 11/1995 | Modrak | 428/171 |
| 5,529,830 | 6/1996 | Dutta et al. | 428/176 |
| 5,865,926 | * 2/1999 | Wu et al. | 156/229 |

FOREIGN PATENT DOCUMENTS

| | | |
|---|---|---|
| 0 079 248 | 5/1983 | (GB) . |
| 2 187 674 | 9/1987 | (GB) . |
| 0 461 484 | 12/1991 | (GB) . |
| 0 479 404 | 4/1992 | (GB) . |
| WO92/15454 | 9/1992 | (WO) . |
| WO96/15903 | 5/1996 | (WO) . |
| WO96/20831 | 7/1996 | (WO) . |

OTHER PUBLICATIONS

Mueller et al., Novel Structures by Microlayer Coextrusion—Talc–Filled PP, PC/SAN, and HDPE/LLDPE, Polymer Engineering and Science, Feb. 1997, vol. 37, No. 2, pp. 355–362.

Schrenk et al., Coextruded Multilayer Polymer Films and Sheets, Polymer Blends, vol. 2, pp. 129–165, no date given.

Imet al., Coextruded Microlayer Film and Sheet, Journal of Plastic Film and Sheeting, Apr. 1988, vol. 4, pp. 104–115.

Robeson et al., Microfiber Formation: Immiscible Polymer Blends Involving Thermoplastic Poly (vinyl alcohol) as an Extractable Matric, Journal of Applied Polymer Sciences, vol. 52, 1837–1846, 1994 (month unknown).

Defensive Publication, published Aug. 1, 1972, T901,007.

* cited by examiner

Primary Examiner—Blaine Copenheaver
Assistant Examiner—Ula C. Ruddock
(74) Attorney, Agent, or Firm—Kilpatrick Stockton, LLP

(57) ABSTRACT

A breathable microlayer polymer film comprising a plurality of coextruded microlayers including a first layer comprising a first melt-extrudable polymer and a second layer comprising second melt-extrudable polymer, the first melt-extrudable polymer having a first water vapor transmission rate and the second melt-extrudable polymer having a second water vapor transmission rate less than the first water vapor transmission rate. A method for making such a breathable film is also disclosed. The microlayer polymer film is breathable, but can also be a barrier to liquid, microbial organisms, organic toxins, and body fluids, and is suitable as a covering material for disposable items such as diapers. While the first polymer is more breathable, the second polymer can impart other properties to the microlayer film such as enhanced tensile properties.

38 Claims, 3 Drawing Sheets

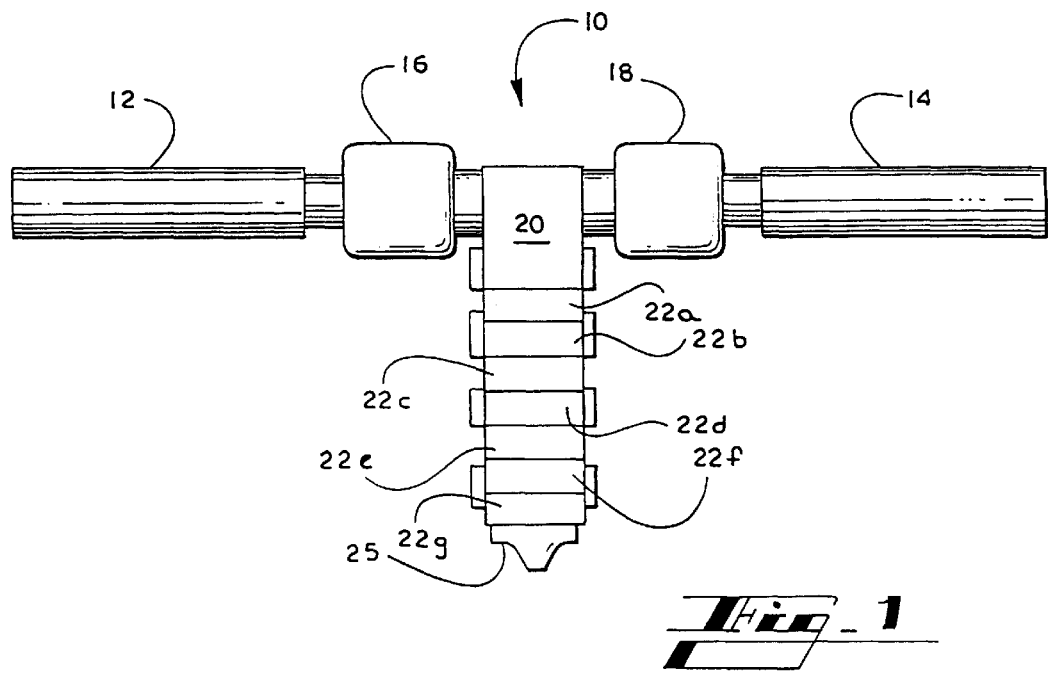
Fig_1
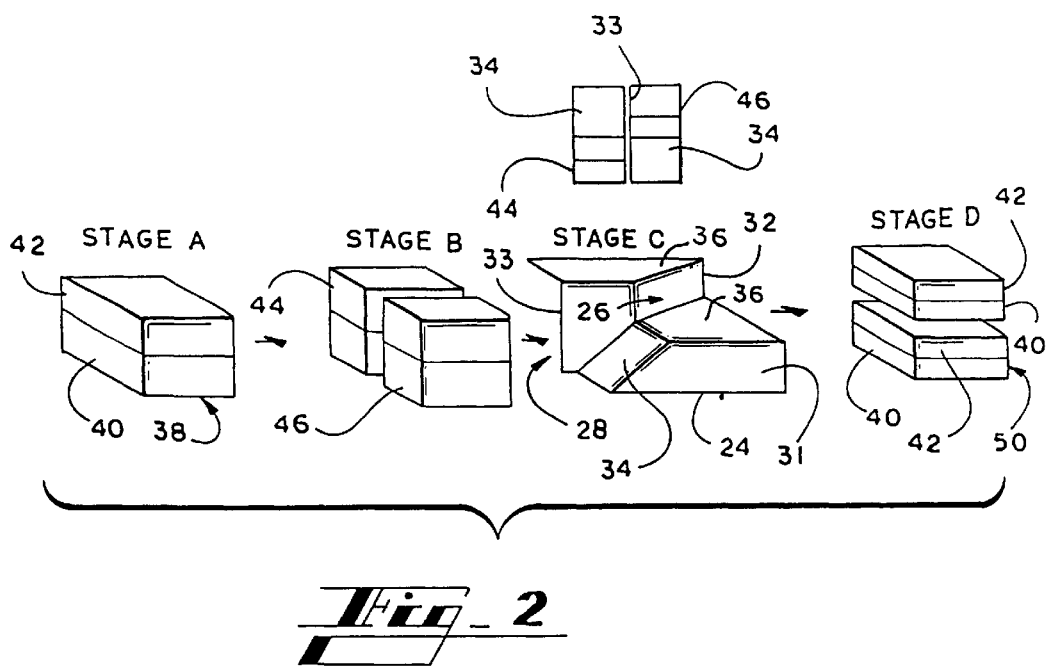
Fig_2

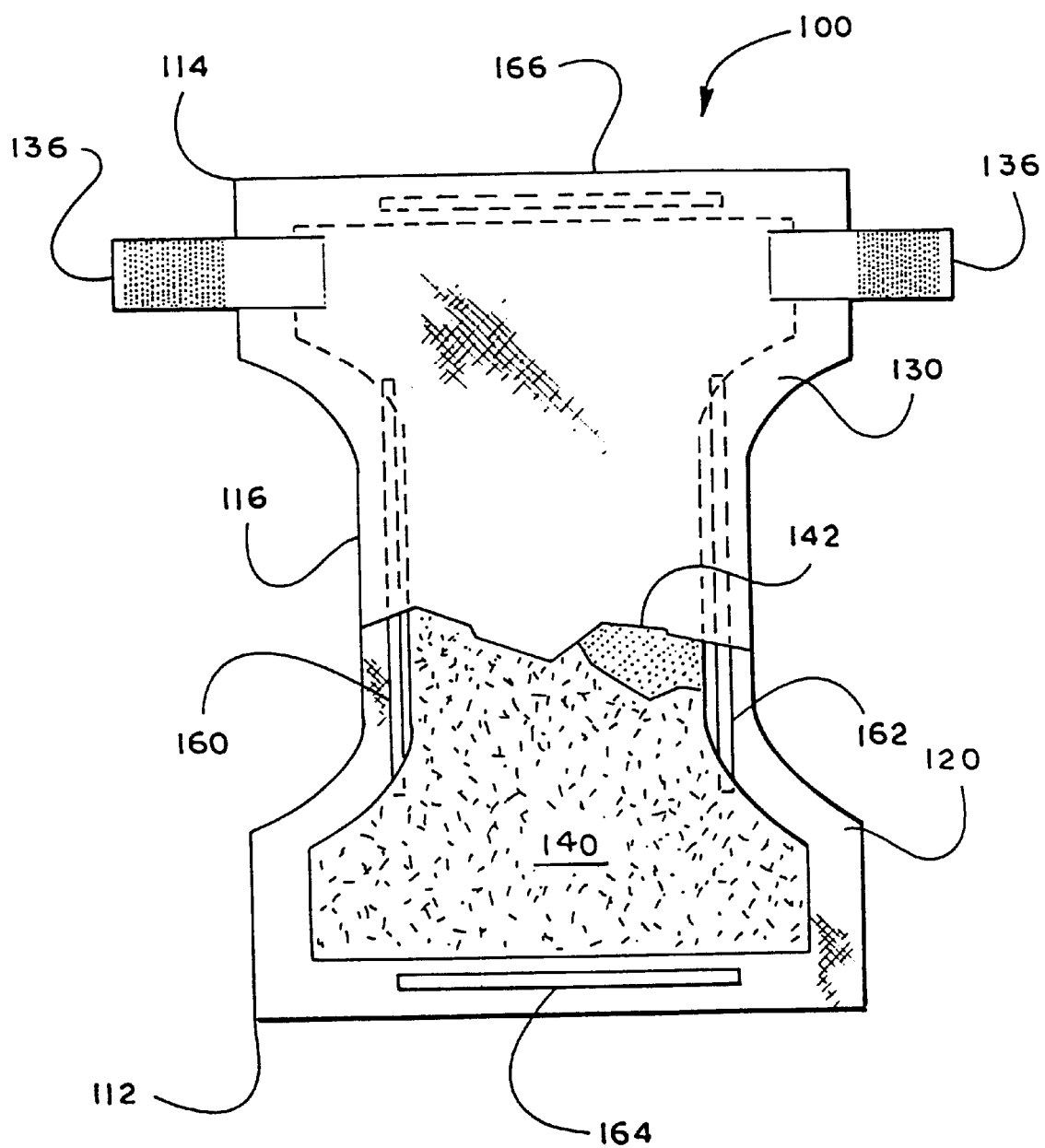
Fig_3

BREATHABLE MICROLAYER POLYMER FILM AND ARTICLES INCLUDING SAME

TECHNICAL FIELD

This invention generally relates to polymer films, and more particularly relates to breathable polymer films for use in making disposable absorbent products.

BACKGROUND OF THE INVENTION

Polymer films are useful in making a variety of disposable articles because polymer films are relatively inexpensive to manufacture, and can be made to be strong, durable, flexible, soft, and a barrier to aqueous liquids such as water. For example, polymer films are used to make disposal personal care items such as diapers, adult incontinence products, feminine care absorbent products, training pants, and the like. In particular, polymer films are suitable outer covers for personal care items and health care products. Polymer films are also useful in making some types of garments and coverings for a variety of articles.

Disposable personal care and health care items, and the like, are often desirably breathable, a barrier to liquids, and strong enough to endure handling in normal use. Breathable means gas or water vapor permeable, liquid barrier means impermeable to liquid, and strength relates to tensile properties. While it is possible to enhance each of these properties of polymer films separately, enhancing the breathability of polymer films, without diminishing the barrier or strength properties of the film, is difficult. For example, certain polymers are more breathable than others, but have unsatisfactory barrier and tensile properties. Other polymers have superior barrier or tensile properties, but are not sufficiently breathable. Accordingly, there is a need for a polymeric film with enhanced breathability and desirable barrier and strength properties for use in making personal care items, health care items, and the like.

SUMMARY OF THE INVENTION

This invention satisfies the above-described need by providing a breathable microlayer polymer film comprising a plurality of coextruded microlayers including a first layer comprising a first melt-extrudable polymer and a second layer comprising a second melt-extrudable polymer, wherein the first melt-extrudable polymer has a first water vapor transmission rate and the second melt-extrudable polymer has a second water vapor transmission rate less than the first water vapor transmission rate. The microlayer film of this invention is breathable, but also has sufficient strength and liquid barrier properties for use in applications such as disposable absorbent personal care and health care products, garments, and other covering materials. The breathability of the film is illustrated by the water vapor transmission rate of the film. The water vapor transmission rate of the microlayer polymer film of this invention is desirably within the range from about 500 to about 15,000 $g/m^2/24$ hrs per 1 mil of film thickness. While the first polymer is chosen to be more breathable than the second polymer, the second polymer can be chosen so that second polymer imparts to the microlayer film properties which the first polymer does not have. For example, the second polymer can have different tensile properties or barrier properties than that of the first polymer. Specifically, the second polymer can be chosen so as to impart greater elongation, tensile strength, toughness, reduce modulus, improve flexibility, higher barrier to liquids, microbial organisms, organic toxins, blood, and the like. Therefore, the microlayer polymer film of this invention is particularly suitable for making personal care items such as diapers, feminine care products, adult incontinence products, and training pants, and health care products such as wound dressings or surgical gowns.

The first and second layers can include a particulate filler material, and preferably a hydrophilic surfactant, to enhance the breathability of the microlayer film. The particulate filler material is particularly useful for enhancing the breathability of the second layer which comprises a less breathable polymer.

More particularly, the microlayer polymer film of this invention includes a plurality of first layers comprising first melt-extrudable polymer and a plurality of second layers comprising second melt-extrudable polymer. The plurality of first layers and plurality of second layers are arranged in a series of parallel repeating laminate units, each laminate unit comprising at least one of the first layers and at least one of the second layers.

Generally, the individual microlayers of the film of this invention have a thickness small enough so that the first and second layers of the microlayer film adhere to one another to form a laminate and do not delaminate. Each microlayer in the polymer film of this invention has a thickness from about 10 angstroms to about 150 microns. Desirably, each microlayer has a thickness which does not exceed 50 microns and preferably does not exceed 10 microns. More particularly, each microlayer has a thickness which is not less than 100 angstroms and preferably not less than 500 angstroms. Broadly described, the film of this invention has first and second layers totaling 8 to 17,000 in number, and preferably 60 to 8000 in number. Thinner microlayer films, such as for personal care product covers, have a total of 60 to 4000 total microlayers. Preferably, such film has 120 to 1000 total microlayers.

More particularly, desirable first (more breathable) melt-extrudable polymers include those having a water vapor transmission rate of at least about 500 $g/m^2/24$ hrs per 1 mil of film thickness and desirable second (less breathable) melt-extrudable polymers include those a water vapor transmission rate of not more than about 100 $g/m^2/24$ hrs per 1 mil of film thickness. For example, suitable first or more breathable polymers for use in this invention include polyethylene oxide (PEO), polycaprolactone and polybutylene succinate. Suitable second or less breathable polymers include polyolefins such as linear low density polyethylene and polypropylene. It should be understood, however, that the foregoing ranges describe desirable polymers for use in this invention, which is not limited to polymers with such water vapor transmission rates. The first and second polymers can both be polymers with high water vapor transmission rates or can both be polymers with low water vapor transmission rates, but the first and second polymers should have different water vapor transmission rates.

According to a particular embodiment of the present invention, each laminate unit of the microlayer film can include a tie layer positioned between the first layer and the second layer for modifying or enhancing properties of the microlayer film. The tie layer can be formed from a variety of polymers. Suitable polymers are chosen depending on the desired properties of the microlayer film. For example, the tie layer polymer can be selected to have an affinity to the first layer or second layer, or both, for improving adhesion and interaction between those layers. The tie layer polymer can also be selected to enhance other properties of the microlayer film such as toughness and barrier.

The microlayer polymer film of this invention desirably has a dry tensile strength of at least about 5 MPa in the machine direction and a hydrostatic burst strength of at least about 1 mbar.

According to another aspect of this invention, a method for making a breathable microlayer polymer film is provided. This method includes coextruding a first melt-extrudable polymer and second melt-extrudable polymer to form a laminate comprising a first layer including the first melt-extrudable polymer and a second layer including the second melt-extrudable polymer, wherein the first melt-extrudable polymer has a first water vapor transmission rate and the second melt-extrudable polymer has a second water vapor transmission rate less than the first water vapor transmission rate. The method further includes separating the laminate while the laminate is in a melt-extrudable state to form a pair of laminate halves each including a portion of the first layer and a portion of the second layer. After separation, the laminate halves are thinned and widened and then stacked on top of one another to reform the laminate so that the laminate comprises a plurality of repeating laminate units in parallel stacking arrangement. Each laminate unit comprises a first layer including the first melt-extrudable polymer and a second layer including the second melt-extrudable polymer. The steps of separating, thinning and widening, and stacking are repeated to form the laminate into the microlayer polymer film. The resulting microlayer film can also be stretched uniaxially or biaxially and thinned to reduce the basis weight of the microlayer film and enhance the water vapor transmission or breathability of the film.

Therefore, an object of this invention is to provide a film which is strong, breathable, and a barrier to small amounts of water and other aqueous liquids.

Another object of this invention is to provide a method for making the foregoing film.

Yet another object of this invention is to provide a cover material for disposable absorbent personal care products, health care products, garments, and other coverings.

Other objects, features, and advantages of the present invention will be appreciated from the following detailed description, drawings, and claims.

BRIEF DESCRIPTION OF DRAWINGS

FIG. 1 is a plan view of a coextrusion system for making a microlayer polymer film in accordance with an embodiment of this invention.

FIG. 2 is a schematic diagram illustrating a multiplying die element and the multiplying process used in the coextrusion system illustrated in FIG. 1.

FIG. 3 is a partial plan view of a diaper made according to an embodiment of the present invention.

DETAILED DESCRIPTION OF DRAWINGS

Figure 4:
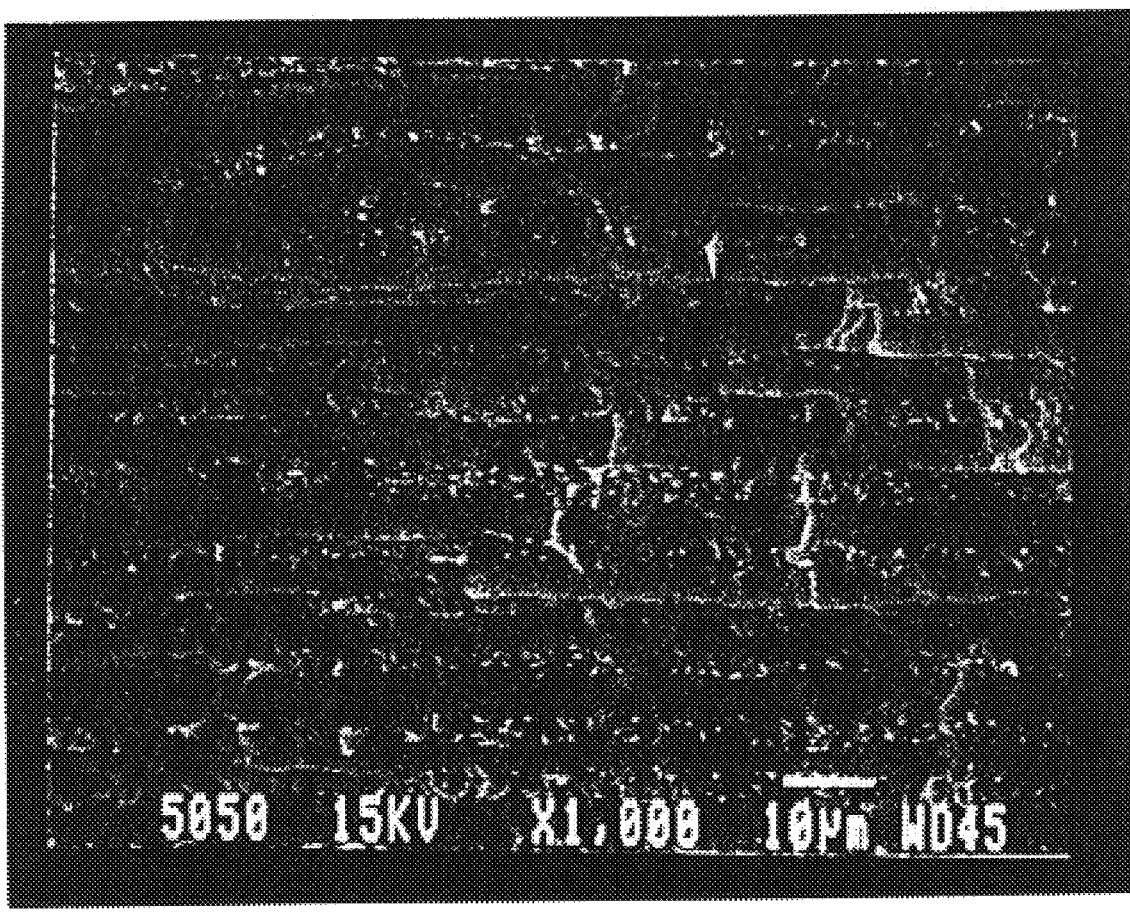
FIG. 4 is a cross sectional SEM photomicrograph microlayer polymer film made in accordance with an embodiment of this invention.

As summarized above, this invention encompasses a microlayer polymer film which is breathable, but has sufficient strength and liquid barrier properties for use in applications such as absorbent personal care product covers, health care product applications, and the like. Below is a detailed description of embodiments of this invention including a method for coextruding the microlayer polymer film, followed by a description of uses and properties of the film and particular examples of the film. U. S. patent application Ser. Nos. 09/001,730 and 09/002,059, both filed on Dec. 31, 1997, disclose water degradable microlayer films and a method for making such films, and the disclosures of such applications are expressly incorporated herein by reference in their entirety.

The microlayer polymer film of this invention comprises a plurality of coextruded microlayers which form a laminate structure. The coextruded microlayers include a plurality of first layers comprising a first melt-extrudable polymer and a plurality of second layers comprising a second melt-extrudable polymer, wherein the first melt-extrudable polymer has a first water vapor transmission rate and the second melt-extrudable polymer has a second water vapor transmission rate less than the first water vapor transmission rate. In other words, the first polymer is more breathable than the second polymer. Breathable means that the polymer, when in the form of a film, is permeable to gas such as water vapor. The microlayer polymer film desirably has a water vapor transmission rate within the range from about 500 to about 15,000 g/m$^2$/24 hrs per 1 mil of film thickness.

The plurality of first and second layers are arranged in a series of parallel repeating laminate units. Each laminate unit comprises at least one of the first layers and at least one of the second layers. Desirably, each laminate unit has one first layer laminated to a second layer so that the coextruded microlayers alternate between first and second layers. Alternatively, each laminate unit can also include a tie or transition layer between the first layer and the second layer. The tie layer is useful for modifying or enhancing properties of the microlayer film.

The microlayer film of the invention is breathable with water vapor transmission rate in the range of about 500 g/sq.m/24 hrs per 1 mil of film thickness to about 15,000 g/sq.m/24 hrs per 1 mil of film thickness. The breathability is provided by tortuous pathways for water vapor/gas through the first, more breathable layers and the breakups or discontinuity in the second, less breathable layers. As explained more below, the uniaxial and/or biaxial stretching of the film enhances the water vapor transmission rate of the microlayer film. In addition, the second polymer in the second layer can impart, to the microlayer film of the invention, improved tensile properties such as elongation at break, tensile strength, and toughness, and reduced modulus, and improved flexibility. Also, the microlayer film can demonstrate a controlled barrier property to liquids such as body fluids, a variety of microbial organisms, and organic toxins.

FIG. 4 is a cross sectional SEM photomicrograph of a microlayer polymer film made in accordance with an embodiment of this invention and illustrates the configuration of alternating layers. The first layers are made of PEO and are smooth in the photomicrograph. Second layers are made of linear low density polyethylene (LLDPE) filled with surfactant-modified calcium carbonate and have a rough texture in the photomicrograph. The film in FIG. 4 has 256 microlayers alternating between microlayers of PEO and LLDPE. Although the layers of the film illustrated in FIG. 4 are continuous, it should be understood that films with discontinuous microlayers are also encompassed by this invention. Having discontinuity in the first or second layers, or both, may be desirable, for example, to enhance adhesion between the layers and enhance water vapor transmission rate.

Generally, the individual microlayers of the film of this invention have a thickness small enough so that the first and second layers of the microlayer film adhere to one another to form a laminate and do not delaminate despite the incompatibility that sometimes exists between the first, more breathable polymer and second, less breathable polymer. Each microlayer in the polymer film of this invention has a thickness from about 10 angstroms to about 150 microns. Desirably, each microlayer has a thickness which does not exceed 50 microns and preferably does not exceed 10 microns. More particularly, each microlayer has a thickness which is at least 100 angstroms and preferably at least 500 angstroms. Preferably, the microlayers of the film have a thickness from about 500 angstroms to about 10 microns. Thicker layers of first and second polymers do not laminate very well and tend to delaminate after coextrusion when the first and second polymers are incompatible. Microlayers, however, form laminate films with high integrity and strength because they do not delaminate after microlayer coextrusion. Microlayers enable combination of 2 or more layers of normally incompatible polymers into a monolithic film with a strong coupling between individual layers without using compatibilizing agents. The term monolithic film here means a film which has multiple layers which adhere to one another and function as a single unit.

The number of microlayers in the film of this invention vary broadly from about 8 to 17,000 in number, and preferably from about 60 to 8000 in number. A suitable cover material for personal care items desirably has from about 60 to about 4000 microlayers and preferably from about 120 to about 1000 microlayers. Thicker films, useful for items such as body fluid absorbing tapes, have from about 4000 to about 17,000 microlayers. Generally, the overall thickness of the microlayer polymer film ranges from about 5 microns to about 1 millimeter. Desirably, the overall thickness of the microlayer polymer film ranges from about 10 microns to about 0.5 millimeters, and preferably ranges from about 25 microns to about 0.3 millimeters. Cover materials for personal care items desirably have a thickness from about 10 microns to about 125 microns and preferably have a thickness from about 25 microns to about 75 microns.

The first microlayers of the film of this invention desirably consist essentially of the first, more breathable, melt-extrudable polymer. The first polymer must be melt-extrudable so that the polymer can be coextruded along with the second, less breathable polymer to form the microlayer film. In addition, the first polymer is preferably permeable to water vapor or breathable when in the form of a film. Suitable first, more breathable polymers are desirably characterized by having a water vapor transmission rate of at least about 500 g/m$^{2/}$24hrs per 1 mil of film thickness and more desirably have a water vapor transmission rate in the range from about 500 to about 15,000 g/m$^{2/}$24hrs per 1 mil of film thickness. Suitable first, more breathable polymer resins include, polyethylene oxide, (PEO), polybutylene succinate, polyvinyl alcohol, polycaprolactone (PCL), polyamide-polyether block copolymers, polyurethanes (e.g., Morthane® resins) water dispersible polyesters and copolyesters, polyethyloxazoline, acrylic acid based copolymers, cellulose derivatives such as methyl cellulose, hydroxypropyl cellulose, and the like, poly(butylene succinate-adipate), poly(lactic acid), polyhydroxybutyrate-covalerate, polyethylene adipate, polypropylene succinate, poly (vinyl pyrrolidone), copolymers of polyethylene oxide and polypropylene oxide, polylactic acid PEO copolymer, other water vapor permeable ethylene oxide copolymers, as well as blends and mixtures thereof. Morthane polyurethane resins are available from Morton International, business having offices in Chicago, Ill.

The preferred first, more breathable polymer for making the breathable microlayer polymer film is PEO. Grafted or chemically modified PEO is also suitable. PEO resins having molecular weights ranging from about 100,000 to 8,000,000 are useful. High molecular weight PEO resins are desirable for enhanced liquid stability, mechanical strength and ductility, while low molecular weight PEO resins provide better melt flow and film forming properties. Examples of particularly suitable PEO resins utilized in this invention include the following: (1) WSR N-80, molecular weight about 200,000, (2) WSR N-750, molecular weight about 300,000, (3) WSR N-3000, molecular weight about 400,000, and (4) WSR K12, molecular weight about 1,000,000, all supplied by Union Carbide in a powder form and pelletized at Planet Polymer Technologies of San Diego, Cali. Suitable grafted or chemically modified PEO resins and their method of making are described in U.S. patent application Ser. Nos. 09/001,408, 09/001,831, and 09/002,197, the disclosures of which applications are expressly incorporated herein by reference.

The second layer of the microlayer film of this invention desirably consists essentially of the second, less breathable melt-extrudable polymer. Suitable second, less breathable polymers are characterized by having a water vapor transmission rate of not more than about 100 g/m$^{2/}$24hrs per 1 mil of film thickness, and desirably have a water vapor transmission rate in the range from about 0 to about 100 g/m$^{2/}$24hrs per 1 mil of film thickness. Although less breathable, the second polymer used to make the second layer of the microlayer film can be chosen to enhance other properties of the microlayer film such as tensile, liquid barrier, and durability properties which the first, more breathable polymer lacks. The second layer of the microlayer film becomes breathable when formed into a thin microlayer because the microlayer, being so thin, tends to be discontinuous and allows tortuous pathways for water vapor or other gas to pass. Stretching of the microlayer film also increases the breathability of the second polymer in the second layer of the microlayer film as does the addition of particulate filler material as explained below.

Again, it should be understood that the present invention is not limited to polymers having the above described water vapor transmission rates. The first and second polymers can both be polymers with high water vapor transmission rates or can both be polymers with low water vapor transmission rates, but the first and second polymers should have different water vapor transmission rates.

The term melt-extrudable polymer as used herein means a thermoplastic material having a melt flow rate (MFR) value of not less than about 0.2 grams/10 minutes, based on ASTM D1238. More particularly, the MFR value of suitable melt-extrudable polymers ranges from about 0.2 g/10 minutes to about 100 g/10 minutes. Desirably, the MFR value of suitable melt-extrudable polymers ranges from about 0.4g/10 minutes to about 50 g/10 minutes, and preferably, ranges from about 0.8 g/10 minutes to about 20 g/10 minutes to provide desired levels of processability.

Although it is not always necessary to stretch the microlayer film of this invention, some suitable melt-extrudable thermoplastic polymers for use in this invention are stretchable in solid state to allow a stretch processing of the microlayered film. The ratio of true tensile fracture stress (tensile force at failure divided by the cross-sectional area of the failed specimen), and the stress at yielding, is useful to determine the stretchability of the polymer film. Such ratio for stretchable melt-extrudable polymers used in this invention ranges from about 1 to about 150, more desirably from about 5 to about 100, and preferably from about 10 to about 50.

Generally, suitable second, less breathable melt-extrudable polymers include thermoplastic polymers, copolymers, and mixtures thereof. Particularly suitable second polymers include polyolefins such as homopolymers of polyethylene or propylene, copolymers of ethylene and propylene, polyethers, copolyethers, and mixtures thereof. Other suitable barrier polymer resins can include polyesters, such as poly(ethylene terephtalate, poly(vinylidene chloride), vinylidene chloride copolymers, poly (vinyl fluoride), and poly vinylidene fluoride, and aliphatic polycarbonates. Desirably, the second, less permeable polymers have a WVTR of not more than about 100 g/sq.m/24hrs per 1 mil of film thickness, and more desirably, have a WVTR in a range from about 0 to about 100 g/sq.m/24hrs per 1 mil of film thickness. Specific second thermoplastic polymers include linear low density polyethylene (LLDPE) resin, Dowlex® NG 3347A available from Dow Chemical Corporation, metallocene polyethylene (MPE), saturated ethylene-octene copolymer, Affinity® EG 8200 resin available from Dow Plastics, and a polypropylene (PP) copolymer based resin. Suitable polypropylene random copolymer resins such as 6D81 and 6D82 are available from Union Carbide Corporation.

Additives may optionally be included in the first and second layers of the microlayer film. Suitable additives include plasticizers, colorants, pigments, antiblocking agents, antistatic agents, slip agents, detackifiers, and antioxidants, and combinations thereof.

More particularly, the first microlayers may include processing additives and solid-state performance modifiers blended with the first, more breathable polymer in amounts from about 0.05 up to 30 parts of additive to 100 parts of polymer resin. Suitable additives include a wide variety of materials such as water, polymer emulsions, surfactants, mineral acids, halogens, urea, polyureas, gelatin, metal halides, metal salts, phenols, phenolic resins, polymeric acids, benzoic acid derivatives, glycol derivatives, phosphoric acid derivatives, sorbitan derivatives, and adipic acid. These various additives can have a plasticizing affect, improve melt flow characteristics, improve strength and toughness, improve modulus, modify crystalline structure, control release properties, and modify electrochemical behavior. Specific examples of suitable additives include polyoxyethylene sorbitan monolaurate, Tween 20, ethoxylated nonyl phenol, Tergitol NP-13 and diethylene glycol dibenzoate. Antioxidants can also be added to improve oxidative stability.

The second layers of the microlayer film of this invention may also include processing additives and solid state modifiers in amounts from about 0.05 to about 5 parts of additive to 100 parts of resin. Such additives may include calcium stearate or other acid scavengers, organo silicone compounds, silicone glycol copolymers, olefinic elastomers, and low molecular weight paraffins or lubricating additives and surfactants. The various additives can have a plasticizing effect, improve the strength and softness of the film, help facilitate the extrusion, film casting and stretch processing. Again, antioxidants and UV stabilizers can also be added to improve oxidative stability and stability to UV light.

Both the first and second layers can also include a supplemental material such as a filler, a surfactant, or other surface active materials. The filler material can be a particulate filler material which can enhance water vapor permeability, reduce cost, modify melt-flow properties of polymeric components, and control interaction with fluids. In a microlayer assembly, when an individual layer thickness is comparable or smaller than a filler particle size, particulate filler material can create discontinuity in layers to provide additional pathways for water vapor to move through the film. The filler material can be a particulate filler material to enhance water vapor permeability of the film. Particulate filler material can also enhance the ability of the microlayer film to absorb or immobilize fluid, provide porosity-initiating debonding sites to enhance the formation of pores when the microlayer film is stretched, and reduce production cost of the microlayer film. In addition, lubricating and release agents can facilitate the formation of microvoids and the development of a porous structure in the film during stretching of the film and can reduce adhesion and friction at filler-resin interface. Surface active materials such as surfactants coated on the filler material can reduce the surface energy of the film, increase hydrophilicity of the film, reduce film stickiness, provide lubrication, or reduce the coefficient of friction of the film.

Suitable filler materials can be organic or inorganic, and are desirably in a form of individual, discreet particles. Suitable inorganic filler materials include metal oxides, metal hydroxides, metal carbonates, metal sulfates, various kinds of clay, silica, alumina, powdered metals, glass microspheres, or vugular void-containing particles. Particularly suitable filler materials include calcium carbonate, barium sulfate, sodium carbonate, magnesium carbonate, magnesium sulfate, barium carbonate, kaolin, carbon, calcium oxide, magnesium oxide, aluminum hydroxide, and titanium dioxide. Still other inorganic fillers can include those with particles having higher aspect ratios such as talc, mica and wollastonite. Suitable organic filler materials include, for example, latex particles, particles of thermoplastic elastomers, pulp powders, wood powders, cellulose derivatives, chitin, chitozan powder, microbial cellulose, powders of highly crystalline, high melting polymers, beads of highly crosslinked polymers, organosilicone powders, and powders of super absorbent polymers, such as polyacrylic acid, and the like, as well as combinations and derivatives thereof. These filler materials can improve toughness, softness, opacity, vapor transmission rate (breathability), water dispersability, biodegradability, fluid immobilization and absorption, skin wellness, and other beneficial attributes of the microlayer film.

The particulate filler material is suitably present in the polymer layers in an amount from about 30 to about 80% by weight of the layer and has an average particle size ranging from about 0.1 to about 50 microns. More particularly, the filler material is present in the polymer layers in an amount not more than about 65% by weight of the layer and the average particle size does not exceed about 20 microns. The particulate filler material is suitably present in the microlayer film in an amount from about 0.5 to about 70% by weight of the film. Desirably, the average particle size of the filler material does not exceed about 10 microns, more desirably does not exceed 8 microns, even more desirably does not exceed about 5 microns, and preferably does not exceed about 1 micron.

Suitable commercially available filler materials include the following:

1. SUPERMITE, an ultrafine ground $CaCO_3$, which is available from ECC International of Atlanta, Ga. This material has a top cut particle size of about 8 microns and a mean particle size of about 1 micron and can be coated with a surfactant, such as Dow Corning 193 surfactant, before mixing with the polymers.
2. SUPERCOAT, a coated ultrafine ground $CaCO_3$, which is available from ECC International of Atlanta, Ga.

This material has a top cut particle size of about 8 microns and a mean particle size of about 1 micron.

3. OMYACARB UF, high purity, ultrafine, wet ground $CaCO_3$, which is available from OMYA, Inc., of Proctor, Vt. This material has a top cut particle size of about 4 microns and an average particle size of about 0.7 microns and provides good processability. This filler can also be coated with a surfactant such as Dow Corning 193 surfactant before mixing with the polymer.

4. OMYACARB UFT $CaCO_3$, an ultrafine pigment surface coated with stearic acid, available from OMYA, Inc. This material has a top cut particle size of about 4 microns and a mean particle size of about 0.7 microns and provides good processability.

Surfactants increase the hydrophilicity of the film and enhance the water vapor permeability of the film. Surface active materials can also improve particulate filler dispersion in the polymer resin. For example, the surface active material may be blended or otherwise incorporated onto the particulate filler material before the filler material is mixed with polymer. Suitable surface active materials can have a hydrophile-lipophile balance (HLB) number from about 6 to about 18. Desirably, the HLB number of the surface active material ranges from about 8 to about 16, and more desirably ranges from about 12 to about 15. When the HLB number is too low, the wettability can be insufficient and when the HLB number is too high, the surface active material may have insufficient adhesion to the polymer matrix of the respective layer, and may be too easily washed away during use. A number of commercially available surfactants can be found in *McMcutcheon's* Vol. 2; Functional Materials, 1995.

Suitable surfactants for treating the particulate filler material, or for addition to the polymer microlayers, include silicone glycol copolymers, ethylene glycol oligomers, acrylic acid, hydrogen-bonded complexes, carboxylated alcohol, ethoxylates, various ethoxylated alcohols, ethoxylated alkyl phenols, ethoxylated fatty esters, stearic acid, behenic acid, and the like, as well as combinations thereof. Suitable commercially available surfactants include the following:

1. Surfactants composed of ethoxylated alkyl phenols, such as IGEPAL RC-620, RC-630, CA-620, 630, 720, CO-530, 610, 630, 660, 710, and 730, which are available from Rhone-Poulenc, Inc. of Cranbury, N.J.
2. Surfactants composed of silicone glycol copolymers, such as Dow Corning D190, D193, FF400, and D1315, available from Dow Corning of Midland, Mich.
3. Surfactants composed of ethoxylated mono and diglycerides, such as Mazel 80 MGK, masil SF 19, and Mazel 165 C, available from PPG Industries of Gurneen, Ill.
4. Surfactants composed of ethoxylated alcohols, such as Genapol 26-L-98N, Genapol 26-L60N, and Genapol 26-L-5 which are available from Hoechst Celanese Corporation of Charlotte, N.C.
5. Surfactants composed of carboxylated alcohol ethoxylates, such as Marlowet 4700 and Marlowet 4703, which are available from Huls America, Inc. of Piscataway, N.J.
6. Ethoxylated fatty esters, such as Pationic 138C, Pationic 122A, Pationic SSL, which are available from R.I.T.A. Corporation of Woodstock, Ill.

The surface active material is suitably present in the respective microlayer in an amount from about 0.5 to about 20% by weight of the microlayer. Desirably, the surface active material is present in the respective microlayer in an amount from about 1 to about 15% by weight of the layer, and more desirably in an amount from about 2 to about 10% by weight of the microlayer. The surface activate material is suitably present on the particulate filler material in an amount from about 1 to about 12% by weight of the filler material. Desirably, the surface active material is present on the particulate filler material in an amount from about 4 to about 10% by weight of the filler material and more desirably from about 6 to about 10% by weight of the filler material.

In the microlayer film of this invention, the first layers desirably constitute 5 to 97% by weight of the microlayer film. Accordingly, the second layers desirably constitute from 95 to 3% by weight of the microlayer of film. More desirably, the first layers constitute 5 to 90% by weight of the microlayer film and the second layers constitute from 95 to 10% by weight of the microlayer of film. Still more desirably, the first layers constitute 10 to 70% by weight of the microlayer film and the second layers constitute 90 to 30% by weight of the microlayer film.

The tie or transition layer described in the alternative embodiment above can be formed from a variety of melt extrudable polymers. Suitable polymers are chosen depending on the desired properties of the microlayer film. For example, the tie layer polymer can be selected to have an affinity to the first or second layers, or both, for improving adhesion and interaction between those layers. The tie layer polymer can also be selected to enhance other properties of the microlayer film such as toughness and barrier. Suitable polymers for the tie layer depend on the particular polymers used for the first and second layers, but generally include ethylene acrylic acid copolymers, thermoplastic polyesters, polyalkane-poly(ethylene oxide) block copolymers, poly (vinyl alcohol) block copolymers, ionomer resins, and the like. Desirably, the tie layer constitutes from about 0.5 to about 20% by weight of the microlayer film. More desirably, the tie layer constitutes from about 1.5 to about 15% by weight of the microlayer film and even more desirably constitutes from about 3 to about 10% by weight of the microlayer of film.

A suitable method for making the microlayer film of this invention is a microlayer coextrusion process wherein two or more polymers are coextruded to form a laminate with two or more layers, which laminate is then manipulated to multiply the number of layers in the film. FIG. 1 illustrates a coextrusion device 10 for forming microlayer films. This device includes a pair of opposed screw extruders 12 and 14 connected through respective metering pumps 16 and 18 to a coextrusion block 20. A plurality of multiplying elements 22*a–g* extend in series from the coextrusion block perpendicularly to the screw extruders 12 and 14. Each of the multiplying elements includes a die element 24 disposed in the melt flow passageway of the coextrusion device. The last multiplying element 22*g* is attached to a discharge nozzle 25 through which the final product extrudes.

A schematic diagram of the coextrusion process carried out by the coextrusion device 10 is illustrated in FIG. 2. FIG. 2 also illustrates the structure of the die element 24 disposed in each of the multiplying elements 22*a–g*. Each die element 24 divides the melt flow passage into two passages 26 and 28 with adjacent blocks 31 and 32 separated by a dividing wall 33. Each of the blocks 31 and 32 includes a ramp 34 and an expansion platform 36. The ramps 34 of the respective die element blocks 31 and 32 slope from opposite sides of the melt flow passage toward the center of the melt flow passage. The expansion platforms 36 extend from the ramps 34 on top of one another.

To make a breathable microlayer film using the coextrusion device 10 illustrated in FIG. 1, a first, more breathable polymer, for example PEO, is extruded through the first single screw extruder 12 into the coextrusion block 20. Likewise, a second, less breathable polymer such as polypropylene copolymer, filled with particulate filler, is extruded through the second single screw extruder 14 into the same coextrusion block 20. In the coextrusion block 20, a two-layer melt laminate structure 38 such as that illustrated at stage A in FIG. 2 is formed with the more breathable PEO forming a layer on top of a layer of the less breathable polypropylene copolymer. The melt laminate is then extruded through the series of multiplying elements 22a–g to form a 256 layer microlaminate with the layers alternating between PEO and polypropylene copolymer. As the two-layer melt laminate is extruded through the first multiplying element 22a, the dividing wall 33 of the die element 24 splits the melt laminate 38 into two halves 44 and 46 each having a layer of filled polypropylene copolymer 40 and a layer of PEO 42. This is illustrated at stage B in FIG. 2. As the melt laminate 38 is split, each of the halves 44 and 46 are forced along the respective ramps 34 and out of the die element 24 along the respective expansion platforms 36. This reconfiguration of the melt laminate is illustrated at stage C in FIG. 2. When the melt laminate 38 exits from the die element 24, the expansion platform 36 positions the split halves 44 and 46 on top of one another to form a four-layer melt laminate 50 having, in parallel stacking arrangement, an polypropylene copolymer layer, a PEO layer, an polypropylene copolymer layer and a PEO layer in laminate form. This process is repeated as the melt laminate proceeds through each of the multiplying elements 22b–g. When the melt laminate is discharged through the discharge nozzle 25, the melt laminate forms a film having 256 layers.

The foregoing microlayer coextrusion device and process is described in more detail in an article Mueller et al., entitled *Novel Structures By Microlayer Extrusion-Talc-Filled PP, PC/SAN*, and *HDPE-LLDPE*. A similar process is described in U.S. Pat. No. 3,576,707 and U.S. Pat. No. 3,051,453, the disclosures of which are expressly incorporated herein by reference.

The relative thickness of the first and second layers of the film made by the foregoing process can be controlled by varying the feed ratio of the polymers into the extruders, thus controlling the constituent volume fraction. In addition, one or more extruders can be added to the coextrusion device to increase the number of different polymers in the microlayer film. For example, a third extruder can be added to add a tie layer to the film.

The breathable microlayer film may be subjected to a selected plurality of stretching operations, such as uniaxial stretching operation or biaxial stretching operation. Stretching operations can provide microporous microlayer film with a distinctive porous microlayered morphology and can enhance water vapor transmission through the film. Stretching of the microlayer film of the invention can significantly enhance the WVTR of the film by initiating porous sites in both first and second layers, as well as initiating breakups of the microlayers. Porous microlayered morphology as well as breakups in the second layers provide additional pathways with reduced tortuousity for water vapor to move through the film. Particulate filler material can provide porosity-initiating debonding sites to enhance the formation of pores when the microlayer film is subjected to a plurality of stretching operations. However, stretching of the microlayer breathable film can reduce barrier property of the film to penetration of liquids and or microorganisms by creating numerous microscopic porous pathways through the film.

The microlayer film of the invention can be pretreated to prepare the film for the subsequent stretching operations. The pretreatment can be done by annealing the film at elevated temperatures, by spraying the film with a surface-active fluid (such as a liquid or vapor from the surface-active material employed to surface-modify the filler material), by modifying the physical state of the microlayer film with ultraviolet radiation treatment, an ultrasonic treatment, or a high-energy radiation treatment. In addition, the pretreatment of the microlayer film may incorporate a selected combination of two or more of the foregoing techniques. A suitable stretching technique is disclosed in U.S. Pat. No. 5,800,758, the disclosure of which is expressly incorporated herein by reference in its entirety.

The key parameters during stretching operations include stretching draw ratio, stretching strain rate, and stretching temperature. During stretching operation, the microlayer film sample can optionally be heated to provide a desired effectiveness of stretching.

In particular aspects of the invention, the draw or stretching system can be constructed and arranged to generate a draw ratio which is not less than 1.1 in machine and/or transverse directions. The draw ratio is the ratio determined by dividing the final stretched length of the microlayer film by the original unstretched length of the microlayer film along the direction of stretching. The draw ratio in the machine direction (MD) can be not less than about 1.1. Desirably, the draw ratio is not less than about 1.5, and optionally is not less than 2. In other aspects, the stretching draw ratio in the MD can be not more than a maximum of about 10. Alternatively, the draw ratio can be not more than about 7 and, optionally, can be not more than about 5 to provide desired effectiveness.

When stretching is arranged in the transverse direction (TD), the stretching draw ratio in the transverse direction (TD) is desirably not less than 1. Alternatively, the draw ratio in the TD can be not less than 1.5, and optionally not less than about 2. In other aspects, the stretching draw ratio in the TD can be not more than about 10. Alternatively, the stretching draw ratio in the TD can be not more than about 7, and optionally can be not more than about 5 to provide desired effectiveness.

The biaxial stretching, if desired, can be accomplished simultaneously or sequentially. With the sequential, biaxial stretching, the first, initial stretching can be conducted in either the machine direction or transverse direction.

The following examples 1 and 2 are comparative examples and examples 3–10 are designed to illustrate particular embodiments of this invention and teach one of ordinary skill in the art how to carryout the invention.

EXAMPLE 1 (COMPARATIVE)

A film was produced using nine cutting and spreading layer multiplying die elements (1024 layers) with a filled polypropylene (PP) copolymer based resin. The resin was based on 6D82 random PP copolymer supplied by Union Carbide and was filled with about 60 wt.% of calcium carbonate ($CaCO_3$) filler with a mean particle size of 1 micron. The filled PP copolymer resin was extruded at 220° C. and the feedblock, layer multipliers, and exit die were set at 220° C. The 15 cm film die and chill roll were used to produce film. The produced film had a thickness of about 1 mil. The WVTR of the film was measured to be 20 $g/m^2/24$ hrs. The film had a tensile strength of 15.3 Mpa, tensile modulus of 380 Mpa, and elongation at break of 230%.

EXAMPLE 2 (COMPARATIVE)

A film was produced using nine layer multiplying die elements from the pellets of polyethylene oxide (PEO)

Polyox® WSRN-3000 resin. To produce pellets, the Polyox®WSRN-3000 resin, in powder form supplied by Union Carbide Corporation, was blended with about 12 wt.% of plasticizer Tween® 20 supplied by ICI Americas Inc. and about 0.5wt. % of antioxidant Irganox 1076 supplied by Ciba Corporation. The pellets were produced using air cooled belt at Planet Polymer Technologies of San Diego, Calif. The pellets of PEO resin were fed into extruder of the microlayer coextrusion line. The extruder temperature was set at 150° C. The 15 cm film die and chill roll were used to produce film. The film thickness was about 1.6 mil and the WVTR of the film was measured to be 3900 gm $^2$/24hrs. The film has tensile strength of about 6 Mpa, tensile modulus of 104 Mpa. and elongation at break of 120%.

EXAMPLE 3

The pellets of PEO resin from Example 2 and filled PP copolymer resin from Example 1 were fed into extruders of microlayer coextrusion line. The extruder temperature was set to 150° C. for the PEO resin and was set to 220° C. for the filled PP resin. The feedblock, layer multipliers, and exit die were set to 220° C. The feed ratio was controlled by setting corresponding pump speeds at 28 rpm (PEO) and 12 rpm (filled PP). A 1024 layer PEO/filled-PP 70/30 film was produced using 9 layer-multiplying die elements and 15 cm exit die. The film thickness was about 1.1 mil. The WVTR of the film was measured to be 1600 g/m$^2$/24 hrs. The film was tensile strength of about 12.2 Mpa, tensile modulus of 115 Mpa, and elongation at break of about 175%.

EXAMPLE 4

The film of Example 3 was stretched in machine direction (MD) to about 250% and the stretch temperature was 70° C. The residual strain after stretching was 220% and the film thickness was 0.4 mil. The WVTR was measured to be 5400 g/m$^{2/}$24hrs.

EXAMPLE 5

The film of Example 3 was stretched in machine direction (MD) to about 200% and the stretch temperature was 70° C. The residual strain after stretching was 140% and the film thickness was about 0.9 mil. The WVTR was measured to be 3100 g/m$^2$/24 hrs.

EXAMPLE 6

The film was produced using the same conditions as in Example 3, except pump speeds were set at 12 rpm for PEO and 28 rpm for filled PP. A 1024 layer PEO/filled-PP 30/70 film was produced with a thickness of about 1.1 mil. The WVTR of the film was measured to be 500 g/m$^2$/24hrs. The film was tensile strength of about 16.5 Mpa, tensile modulus of 113 Mpa, and elongation at break of about 282%.

EXAMPLE 7

The film was produced using the same conditions as in Example 3, except 7 layer-multiplying die elements have been used. A 256 layer PEO/filled-PP 70/30 film was produced with a thickness of about 1 mil. The WVTR of the film was measured to be about 900 g/m $^{2/}$24 hrs. The film has tensile strength of about 17.6 Mpa, tensile modulus of 115 Mpa, and elongation at break of about 169%.

EXAMPLE 8

The film was produced using the same conditions as in Example 3, except 11 layer-multiplying die elements were used. A 4096 layer PEO/filled PP 70/30 film was produced with a thickness of about 1 mil. The WVTR of the film was measured to be about 3000 g/m$^{2/}$24 hrs. The film has tensile strength of about 13.2 Mpa, tensile modulus of 100 Mpa, and elongation at break of about 250%.

EXAMPLE 9

Pellets of polycaprolactone (PCL) resin, Tone® P-787 supplied by Union Carbide, and pellets of the filled PP resin from Example 1 were fed into extruders of microlayer coextrusion line. The extruder temperature was set to 150° C. for the PCL resin and was set to 220° C. for the filled PP resin. The feedblock, layer multipliers, and exit die were set to 220° C. The feed ration was controlled by setting corresponding pump speeds at 38rpm for PCL and 2 rpm for the filled PP. A 1024 layer PCL/filled PP (95/5) film was produced using 9 layer-multiplying dies. The film thickness was about 0.9 mil. The WVTR of the film was measured to be about 1300 g/m$^{2/}$24 hrs.

EXAMPLE 10

The film was produced using the same materials and conditions as in Example 9, except 4 layer-multiplying die were used. A 32 layer PCL/filled-PP (95/5) film was produced with a thickness of about 1.6 mil. The WVTR of the film was measured to be about 440 g/m$^2$/24 hrs.

Properties of the Microlayer Film

Properties of the films made according to Examples 1 through 10 were measured according to the techniques described below.

Uniaxial stress-strain measurements were performed using an Instron model 1122 universal testing machine. Microntensile specimens were cut in the extrusion direction of the film and thickness measurements were performed with a film gauge. Tests were done at room temperature with a strain rate of 50%/min. The mechanical properties include tensile modulus, tensile stress at break, and % strain or elongation-at-break.

Water vapor transmission rates were measured according to procedures described in ASTM E96-93. The film sample covered a petri dish filled with distilled water. The mass of water lost from the dish was monitored as a function of time and a water vapor transmission rate was obtained from the steady-state region. The test samples were cut from the center of the films. A 5 cm×5 cm window was cut in a sheet of aluminum foil and the film was attached to the aluminum with 5 Minute® Epoxy (Devcon) glue. The aluminum foil mask containing the film sample was attached to the top of a plastic petri dish using epoxy. Using a syringe, 20–30 mL of distilled water was added to the petri dish and the hole was sealed with epoxy. After allowing the epoxy to cure for an hour, the samples were weighed and then placed in a convection oven at 40° C. and about 15–20%RH. The samples were periodically removed and weighed and the weight loss as a function of time was recorded. The Celgarde® 2500 microporous film was used as a control.

Other properties of the film such as barrier and strength properties can be controlled by the selection of the particular second, less breathable polymer and the amount of the second polymer present in the film. For example, the strength of the microlayer film can be greater with a greater amount of the second polymer in the film. Increasing the relative amount of the second polymer in the film can also increase the barrier property of the film.

The water vapor transmission rate or breathability of the film of the invention can be controlled by the relative amount of first, more breathable polymer in the film, the amount of particulate filler in the second, less breathable polymer, the amount of hydrophilic surfactant in the film, the number of microlayers in the film, and the film thickness. Also, the WVTR can be controlled by the amount and mode (uniaxial vs. biaxial) of stretching applied to the film. Increasing the first, more permeable resin content, the overall number of microlayers, the filler content, the surfactant amount, and the amount of stretch applied enhances the breathability of the film. Biaxial stretching can produce microlayer film with larger breathability compared to uniaxial stretching.

The microlayer film of this invention can be laminated to one or more nonwoven webs. Accordingly, the microlayer film of this invention is suitable for applications such as cover materials for absorbent personal care items including diapers, adult incontinence products, feminine care absorbent products, training pants, and health care products such as wound dressings. The microlayer film of this invention can also be used to make surgical drapes and surgical gowns and other disposable garments FIG. 3 illustrates a disposable diaper 100 made according to an embodiment of this invention. The diaper 100 includes a front waistband panel section 112, a rear waistband panel section 114, and an intermediate section 116 which interconnects the front and rear waistband sections. The diaper 100 comprises an outer cover layer 120 which is a breathable microlayer polymer film described above, a liquid permeable liner layer 130, and an absorbent body 140 located between the outer cover layer and the liner layer. Fastening means, such as adhesive tapes 136 are employed to secure the diaper 100 on the wearer. The liner 130 and the outer cover 120 are bonded to each other and to the absorbent body with lines and patterns of adhesive, such as a hot melt, pressure-sensitive adhesive. Elastic members 160, 162, 164, and 166 can be configured about the edges of the diaper for a close fit about the wearer.

The liner layer 130 presents a body-facing surface which is compliant to the wearer's skin. A suitable liner may be manufactured from a wide selection of web materials, such as porous foams, reticulated foams, apertured plastic films, natural fibers (for example, wood or cotton fibers), synthetic fibers (for example, polypropylene or polyester fibers), or a combination of natural and synthetic fibers. Various woven and nonwoven fabrics can be used for liner. For example, the liner may be composed of a meltblown or spunbonded web of polyolefin fibers. The liner 130 may be composed of a hydrophobic material, and the hydrophobic material may be treated with a surfactant or otherwise processed to impart desired level of wettability and hydrophilicity. In particular, liner 130 can be a spunbond polypropylene fabric which is surface treated with Triton X-102 surfactant.

The absorbent body 140 can comprise a matrix of substantially hydrophilic fibers having therein a distribution of high-absorbency material, such as particles of superabsorbent polymer. Examples of suitable fibers include organic fibers, such as cellulosic fibers; synthetic fibers made from wettable thermoplastic polymers such as polyester or polyamide; and synthetic fibers composed of nonwettable polymer, such as polypropylene fibers, which have been hydrophilized by appropriate treatment.

The high absorbency material of the absorbent body 140 may comprise absorbent gelling materials, such as superabsorbents. Examples of synthetic absorbing gelling material include the alkali metal and ammonium salts of poly(acrylic acid) and poly(methacrylic acid), poly(acrylamides) and poly(vinyl ethers).

For example, the breathable outercover 120 may be composed of a breathable microlayer film of the current invention which can be optionally laminated with a nonwoven fabric. Examples of suitable fibers for the nonwoven fabric include organic fibers, such as cellulosic fibers; synthetic fibers made from thermoplastic polymers such as polyester or polyamide; and synthetic fibers composed of thermoplastic polymer, such as polypropylene fibers. The nonwoven fabric can be optionally coated or otherwise treated to impart desired level of liquid impermeability. Optionally, the microlayer film of the current invention can also be modified or otherwise treated to enhance its barrier property to the level desirable for in-use performance. To enhance barrier property of the microlayer film of the invention, a thin additional barrier layer can be coated or coextruded with the microlayer film.

The outercover material 120 can also be embossed or otherwise be provided with a matte finish to exhibit a more aesthetically pleasing appearance.

Although the absorbent article 100 shown in FIG. 3 is a disposable diaper, it should be understood that the microlayer film of this invention can be used to make a variety of absorbent articles such as those identified above.

While the invention has been described in detail with respect to specific embodiments thereof, it will be appreciated that those skilled in the art, upon attaining an understanding of the foregoing, will readily conceive of alterations to variations of and equivalents to these embodiments. Accordingly, the scope of the present invention should be assessed as that of the appended claims and any equivalence thereto.

We claim:

1. A breathable microlayer polymer film comprising a plurality of coextruded microlayers including a first layer comprising a first melt-extrudable polymer and a second layer comprising a second melt-extrudable polymer, wherein the first melt-extrudable polymer has a first water vapor transmission rate and the second melt-extrudable polymer has a second water vapor transmission rate less than the first water vapor transmission rate.

2. A microlayer polymer film as in claim 1 wherein the microlayer polymer film has a water vapor transmission rate within the range from about 500 to about 15,000 g/m$^2$/24 hrs per 1 mil of film thickness.

3. A microlayer polymer film as in claim 1 wherein the first melt-extrudable polymer has a water vapor transmission rate of at least about 500 g/m$^2$/24 hrs per 1 mil of film thickness and the second melt-extrudable polymer has a water vapor transmission rate of not more than about 100 g/m$^2$/24 hrs per 1 mil of film thickness.

4. A microlayer polymer film as in claim 1 wherein the first melt-extrudable polymer has a water vapor transmission rate in the range from about 500 to about 15,000 g/m$^2$/24 hrs per 1 mil of film thickness and the second melt-extrudable polymer has a water vapor transmission rate in the range from about 0 to about 100 g/m$^2$/24 hrs per 1 mil of film thickness.

5. A microlayer polymer film as in claim 1 wherein the first melt-extrudable polymer is polyethylene oxide or polycaprolactone.

6. A microlayer polymer film as in claim 5 wherein the second melt-extrudable polymer is a polyolefin.

7. A microlayer polymer film as in claim 6 wherein the polyolefin is linear low density polyethylene or polypropylene.

8. A microlayer polymer film as in claim 1 wherein the second layer further comprises a particulate filler dispersed in the second melt extrudable polymer.

9. A microlayer polymer film as in claim 8 wherein the particulate filler has a particle size within a range from about 0.1 to about 50 microns.

10. A microlayer polymer film as in claim 8 wherein the particulate filler has a particle size within a range from about 0.1 to about 20 microns.

11. A microlayer polymer film as in claim 1 having a thickness from about 5 microns to about 1 mm.

12. A microlayer polymer film as in claim 1 having a thickness from about 10 microns to about 125 microns.

13. A microlayer polymer film as in claim 1 having a thickness from about 25 microns to about 75 microns.

14. A microlayer polymer film as in claim 1 wherein the microlayers have a thickness from about 10 angstroms to about 150 microns.

15. A microlayer polymer film as in claim 1 wherein the film is stretched.

16. A microlayer polymer film as in claim 1 wherein the microlayer polymer film has a dry tensile strength of at least 5 MPa in the machine direction.

17. A microlayer polymer film as in claim 1 wherein the microlayer polymer film has a hydrostatic burst strength of no less than 1 mbar.

18. A microlayer polymer film as in claim 1 wherein the second layer is discontinuous.

19. A microlayer polymer film as in claim 1 wherein the plurality of coextruded microlayers include a plurality of first layers comprising the first melt-extrudable polymer and a plurality of second layers comprising the second melt-extrudable polymer, the plurality of first layers and plurality of second layers arranged in a series of parallel repeating laminate units each laminate unit comprising at least one of the first layers and at least one of the second layers.

20. A microlayer polymer film as in claim 19 wherein the microlayers have a thickness from about 10 angstroms to about 150 microns.

21. A microlayer polymer film as in claim 19 wherein the first and second layers total 8 to 17,000 in number.

22. A microlayer polymer film as in claim 19 wherein the first and second layers total 60 to 4000 in number.

23. A microlayer polymer film as in claim 19 wherein the first and second layers total 120 to 1000 in number.

24. A microlayer polymer film as in claim 19 wherein the first and second layers total 4000 to 17,000 in number.

25. A microlayer polymer film as in claim 19 wherein the microlayers have a thickness from about 10 angstroms to about 150 microns and the first and second layers total 60 to 4000 in number.

26. A microlayer polymer film as in claim 19 wherein each laminate unit further comprises a tie layer between and laminated to the first and second layers, the tie layer comprising a melt-extrudable polymer.

27. A microlayer polymer film as in claim 26 wherein the tie layer comprises a polymer selected from the group consisting of ethylene acrylic acid copolymers, thermoplastic polyesters, polyalkane-poly(ethylene oxide) block copolymers, and poly(vinyl alcohol) block copolymers.

28. A microlayer polymer film as in claim 1 further comprising a tie layer between and laminated to the first layer and the second layer, the tie layer comprising a melt-extrudable polymer.

29. A microlayer polymer film as in claim 27 wherein the tie layer comprises a polymer selected from the group consisting of ethylene acrylic acid copolymers, thermoplastic polyesters, polyalkane-poly(ethylene oxide) block copolymers, and poly(vinyl alcohol) block copolymers.

30. A personal care item comprising a body of absorbent material and a microlayer polymer film as in claim 1 attached to the body of absorbent material.

31. A personal care item as in claim 30 wherein the personal care item is a diaper.

32. A personal care item as in claim 30 wherein the 30 personal care item is an adult incontinence product.

33. A personal care item as in claim 30 wherein the personal care item is a feminine care absorbent product.

34. A personal care item as in claim 30 wherein the personal care item is a training pant.

35. A wound dressing comprising a body of absorbent material and a microlayer polymer film as in claim 1 attached to the body of absorbent material.

36. A disposable garment comprising a microlayer polymer film as in claim 1.

37. A laminate comprising a microlayer film as in claim 1 laminated to one or more non-woven webs.

38. A breathable microlayer polymer film comprising a plurality of coextruded microlayers including a first layer comprising a first melt-extrudable polymer and a second layer comprising a second melt-extrudable polymer, wherein the first melt-extrudable polymer has a first water vapor transmission rate and the second melt-extrudable polymer has a second water vapor transmission rate less than the first water vapor transmission rate; and, wherein the second layer further comprises a particulate filler dispersed in the second melt extrudable polymer; and, wherein the particulate filler material has a surface and the second layer includes a surfactant on the surface of the particulate filler material for enhancing the hydrophilicity of the particulate filler material.

\* \* \* \* \*